United States Patent [19]

Metz

[11] Patent Number: 4,729,280

[45] Date of Patent: Mar. 8, 1988

[54] RECOIL BRAKE

[75] Inventor: Josef Metz, Neuss, Fed. Rep. of Germany

[73] Assignee: Rheinmetall GmbH, Düsseldorf, Fed. Rep. of Germany

[21] Appl. No.: 920,057

[22] Filed: Oct. 17, 1986

[30] Foreign Application Priority Data

Oct. 19, 1985 [DE] Fed. Rep. of Germany ....... 3537322

[51] Int. Cl.$^4$ ............................................. F41F 19/02
[52] U.S. Cl. ..................................... 89/43.01; 89/198
[58] Field of Search ...................... 89/43.01, 198, 177, 89/43.02

[56] References Cited

U.S. PATENT DOCUMENTS

| | | | |
|---|---|---|---|
| 462,970 | 11/1891 | Krone | 89/43.01 |
| 1,159,543 | 11/1915 | Stock | 89/43.01 |
| 1,333,283 | 3/1920 | Schneider | 89/43.01 |

FOREIGN PATENT DOCUMENTS

| | | | |
|---|---|---|---|
| 70100 | 7/1892 | Fed. Rep. of Germany | 89/43.01 |
| 423490 | 1/1926 | Fed. Rep. of Germany | 89/43.01 |
| 3133144 | 3/1983 | Fed. Rep. of Germany | 89/43.01 |
| 341531 | 3/1904 | France | 89/43.01 |
| 896227 | 2/1945 | France | 89/43.01 |
| 279 | of 1884 | United Kingdom | 89/43.01 |

OTHER PUBLICATIONS

"Waffentechnisches Taschenbuch" [Handbook on Weapontry], 4th Edition, 1977, pp. 448–451. Also enclosed are copies of the corresponding pages from the 1982 English language edition.

Primary Examiner—Stephen C. Bentley
Assistant Examiner—S. Johnson
Attorney, Agent, or Firm—Spencer & Frank

[57] ABSTRACT

A recoil brake 10 for a gun includes a cylinder 11 and a piston 12 which is slidably mounted in cylinder 11, with braking force being supplied when piston 12 is extracted by the recoil movement of the gun barrel and presses hydraulic fluid through a narrow flow cross section. In order to be able to accommodate the recoil brake in an area protected against enemy fire or shrapnel, even if space is cramped, the structural length of the recoil brake is reduced by including a further piston rod in the form of a hollow cylinder which is disposed within cylinder 11 so as to coaxially surround the first piston rod 12. This second piston rod 13 is extracted only after the first piston rod 12 has reached its maximum extended position.

4 Claims, 3 Drawing Figures

RECOIL BRAKE

BACKGROUND OF THE INVENTION

The present invention relates to a recoil brake for a gun, and more particularly to a recoil brake of the type which includes a cylinder containing hydraulic fluid, a piston which is slidably mounted in the cylinder and which is pulled out by recoil movement of the gun barrel, and means cooperating with the piston and defining a narrow flow cross section for imparting a braking force on the gun barrel when hydraulic fluid is displaced as the piston is pulled out of the cylinder, the piston pressing the displaced fluid through the narrow flow cross section.

A recoil brake of the type in question is disclosed in "Waffentechnisches Taschenbuch" [Handbook on Weaponry], published by Rheinmetall, 4th Edition, 1977, pages 448 to 450.

A recoil brake serves to brake the recoil of the gun barrel after firing and is used, in particular, for weapons mounted in turrets, such as guns in tanks or other armored vehicles. Conventional recoil brakes have an installed length which substantially exceeds the recoil distance of the gun barrel. The parts of the recoil brake protruding from the turret opening are particularly endangered since they are without protection against enemy fire or shrapnel.

SUMMARY OF THE INVENTION

It is an object of the present invention to provide a recoil brake, particularly for cannons which have a long recoil path and which are used in confined spaces, with such recoil brake being distinguished by an extremely short structure so that the brake itself can be installed in the area protected by the armor or at least behind a weapon orifice plate.

This is accomplished by providing a recoil brake which includes a cylinder to contain hydraulic fluid; a piston member mounted in the cylinder for sliding movement between an inserted position and an extended position, the piston member being operatively connected to the gun barrel and being pulled out of the cylinder by the gun barrel's recoil movement, the piston member displacing hydraulic fluid when it is pulled out of the cylinder; and means, cooperating with the piston member and defining a narrow flow cross section, for imparting a braking force on the gun barrel when hydraulic fluid is displaced as the piston member is pulled out of the cylinder, the piston member pressing the displaced fluid through the narrow flow cross section; and which further includes hollow cylinder means for providing another piston, the hollow cylinder means being slidably mounted in the cylinder and cooperating with the piston member, the hollow cylinder means coaxially surrounding the piston member and being extended by the piston member after the piston member has been pulled out of the cylinder to an intermediate position that lies between the inserted and extended positions.

DESCRIPTION OF THE PREFERRED EMBODIMENTS

Figure 1:
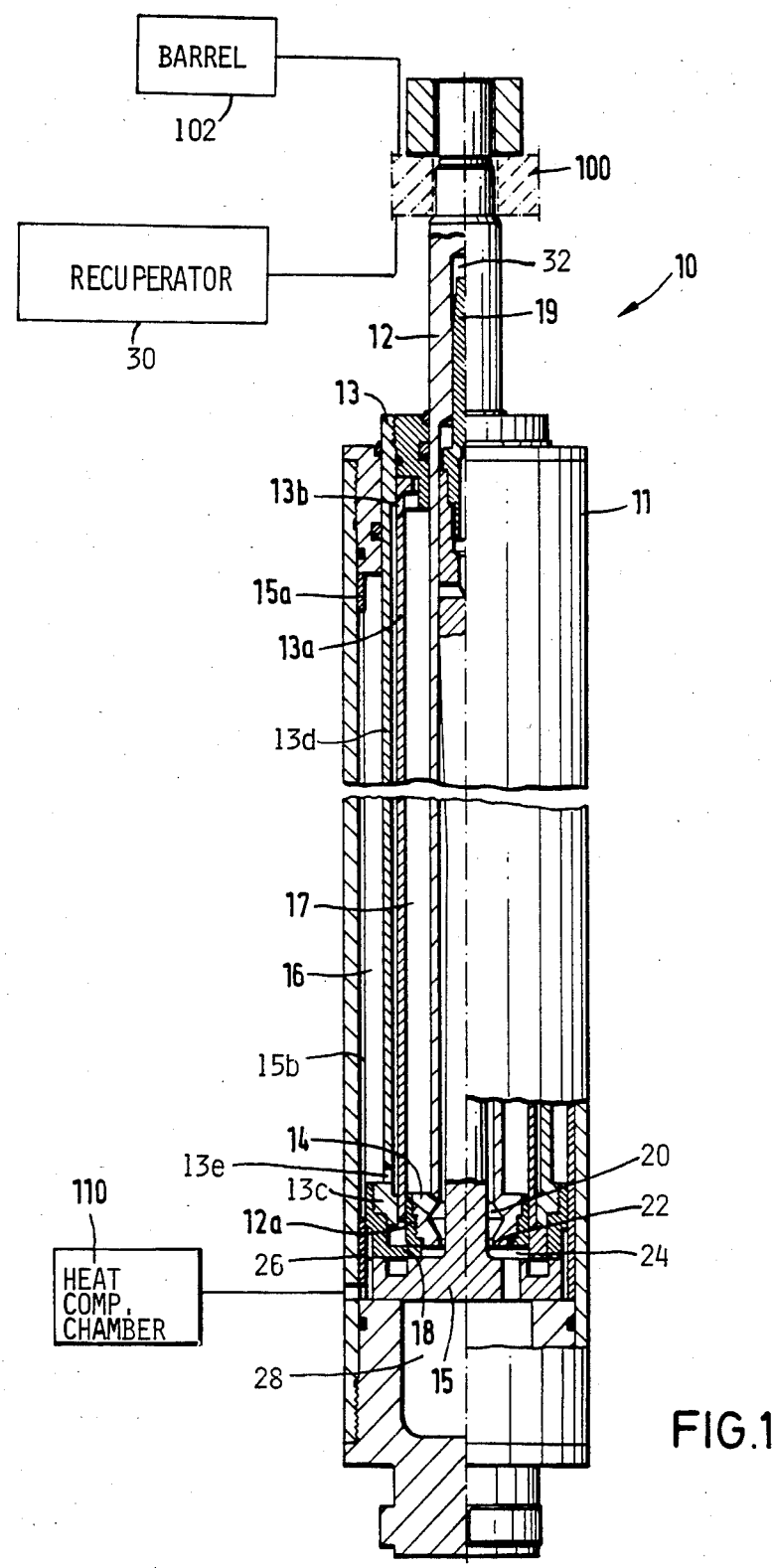
FIG. 1 is a partial longitudinal sectional view of the recoil brake of the present invention in a first operating state, with the piston retracted.

Referring to FIG. 1, the recoil brake 10 includes a cylinder 11 in which a two-stage telescoping piston rod 12, 13 is mounted so as to be able to slide. Piston rods 12 and 13 are hollow. The inner piston rod 12 is connected with the breech 100 of a weapon having a barrel 102. Piston 12a, which is connected to piston rod 12 to form a piston member with rod 12, is provided with flow channels 14 leading to an annular cavity 20 and thence to a throttling cross section within piston 12a, as will be discussed. Piston 13c is connected to outer piston rod 13 to form another piston member. A control rod 15 fastened to the piston 13c is mounted within hollow piston rod 12 and extends through cavity 20. An annular gap (not numbered to avoid obscuring the drawing) formed between lower lip 22 of piston 12a and the outer surface of control rod 15 communicates between cavity 20 and the region 24 below piston 12a, and serves the purpose of producing a defined throttling cross section which can be changed in a first recoil region of the recoil brake. That is, the diameter of control rod 15 is varied slightly along the height of control rod 15 in order to vary the size of the annular gap during the recoil. In this way the braking force can be controlled during the initial moments of the recoil.

The outer piston rod 13 is made of two parts. It includes a first intermediate cylinder 13a provided with bores 13b and a second intermediate cylinder 13d provided with bores 13e. Intermediate cylinders 13a and 13d are spaced slightly apart, and bores 13b and 13e permit pressure equalization between a first interior pressure chamber 17 and a second exterior pressure chamber 16. In the transition phase at the beginning of the extension movement of piston rod 13, this piston rod 13 is thus able to perform a smooth starting movement. The throttling surfaces which become effective during the lifting movement of piston rod 13 are embedded in a control sleeve 15a which itself is mounted in cylinder 11. Control sleeve 15a is provided with control grooves 15b, the lower ends of which are sealed by piston 13c from passage 26 and thus from chamber 28 when brake 10 is positioned as illustrated in FIG. 1. Piston 12a has a smaller piston surface area than that of piston 13c. Because of this, during recoil, the inner piston rod 12 is extended first and then piston rod 13. This produces an unequivocal association of the throttling cross sections with the recoil movement of the different piston rods 12, 13.

During extension of the inner piston rod 12, the piston 13c of piston rod 13 seals off the throttling cross sections (that is, grooves 15b) in control sleeve 15a. Thus, during this phase of operation, the hydraulic oil is able to flow out only through flow channels 14, cavity 20, and the annular gap between lip 22 and control rod 15. To be able to return both piston rods 12, 13 definitely to their starting positions after the recoil brake advances, piston 13c is provided with dogs 18 which cause piston rod 13 to also be returned to its starting position when piston rod 12 is retracted.

Figure 2:
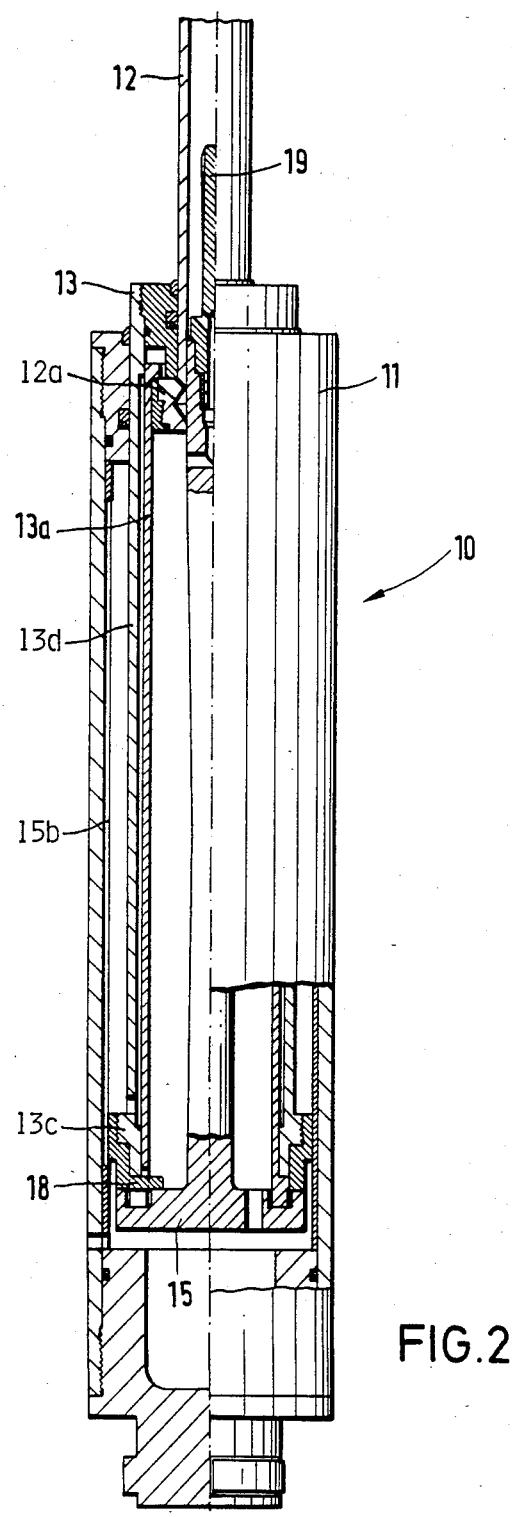
FIG. 2 is a partial longitudinal sectional view of the recoil brake of FIG. 1 in a second operational state, with the piston partially extended.

Control rod 15 has such a configuration that, at the end of the stroke of piston rod 12, the throttling cross section in its piston 12a is sealed (see, for example, FIG. 2). Moreover, control rod 15 is equipped with a counterrecoil restraint 19 which serves to attenuate the counterrecoil at the end of its phase.

To realize the shortest possible structural length of the recoil brake, heat compensation chamber 110 is disposed externally.

Figure 3:
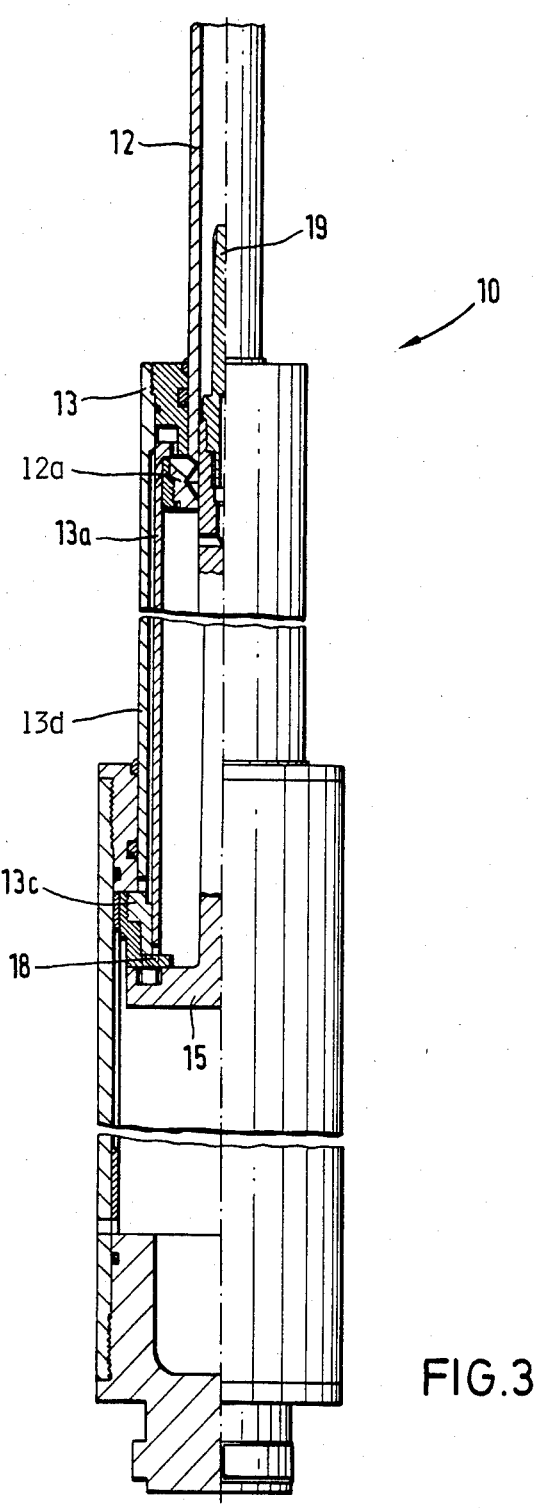
FIG. 3 is a partial longitudinal sectional view of the recoil brake of FIG. 1 in a third operating state, with the piston fully extended.

The recoil brake operates as follows:

After a shot is fired, breech 100 pulls piston rod 12 out of the recoil brake 10. Since, during the first phase of recoil, the hydraulic oil in the recoil brake 10 is throttled to flow out only through aperture 14 and the annular gap between piston 12a and control rod 15, a hydraulic pressure develops in the hydraulically connected pressure chambers 16 and 17, holding piston 13c in the end position because of its larger surface area. When piston 12a reaches the top end of piston rod 13, as illustrated in FIG. 2, piston rod 12 begins pulling piston rod 13 out of cylinder 11. This raises piston 13c from the lower ends of grooves 15b. The hydraulic fluid in chamber 16 is thus discharged in a throttled manner through grooves 15b in control sleeve 15a. FIG. 3 illustrates recoil brake 10 in its fully extended position. In this second phase of recoil braking, the recoiling mass connected to breech 100 is braked until it ceases to move. A recuperator 30 (see FIG. 1) then pulls the mass back again by way of the bottom member 100. This causes piston rod 12 to be pushed back into the recoil brake 10. When piston 12a of piston rod 12 reaches dogs 18, piston rod 13 is also pushed in. Pushing the two piston rods 12 and 13 in causes part of the hydraulic oil to be pressed into hollow piston rod 12. The remaining, major, portion of the hydraulic oil is pressed back into pressure chambers 16 and 17 via flow channels 14 and the grooves 15b in control sleeve 15a. Toward the end of the counterrecoil of the mass, the counterrecoil restraint 19 enters into the restraining chamber 32 (see FIG. 1) of advancing piston rod 12 and, through a throttle opening (not illustrated), displaces the hydraulic oil from the restraining chamber 32. This causes the counterrecoil velocity of the recoiling mass to be damped to such an extent that it is able to smoothly enter the firing position. The recoil brake 10 has again reached its starting position before firing.

In one embodiment of the invention, the installation length of the recoil brake was only 800 mm with a recoil distance of the gun barrel of about 950 mm.

The present disclosure relates to the subject matter disclosed in application Ser. No. P 35 37 322.9, filed Oct. 19th, 1985 in the Federal Republic of Germany, the entire specification of which is incorporated herein by reference.

It will be understood that the above description of the present invention is susceptible to various modifications, changes and adaptations, and the same are intended to be comprehended within the meaning and range of equivalents of the appended claims.

What I claim is:

1. A recoil brake for a gun having a barrel, comprising:
   an outer cylinder to contain hydraulic fluid;
   a hollow first piston rod mounted in said outer cylinder for sliding movement between an inserted position and an extended position, said first piston rod being operatively connected to said gun barrel and being pulled out of said outer cylinder by recoil movement of said gun barrel
   a hollow second piston rod slidably mounted in said outer cylinder and cooperating with said first piston rod, said second piston rod coaxially surrounding said first piston rod and being extended by said first piston rod after said first piston rod has been pulled out of said outer cylinder to an intermediate position that lies between said inserted and extended positions, said second piston rod being spaced apart from said outer cylinder to provide a pressure chamber between said outer cylinder and said second piston rod;
   an intermediate hollow member disposed between said first and second piston rods, said intermediate hollow member being attached to said second piston rod and being spaced apart from said second piston rod, said intermediate hollow member additionally being spaced apart from said first piston rod to provide another pressure chamber between said first piston rod and said intermediate hollow member;
   a first piston connected to said first piston rod to displace hydraulic fluid when said first piston rod is pulled out of said outer cylinder, said first piston surrounding said first piston rod, said first piston having an aperture therein and having a flow channel communicating with said another pressure chamber;
   equalization means for equalizing hydraulic pressure between said pressure chamber and said another pressure chamber, said equalization means including at least one bore in said intermediate hollow member and at least one bore in said second piston rod;
   first choke means, cooperating with said first piston and defining a narrow flow cross section, for imparting a braking force on said gun barrel when hydraulic fluid is displaced as said first piston rod is pulled out of said outer cylinder, said first choke means including a control rod which is operatively connected to said second piston rod, said control rod extending through said aperture in said first piston and being exposed to said another pressure chamber via said flow channel in said first piston, said control rod having a cross sectional area which changes along the length thereof to control said narrow flow cross section of said first choke means;
   a second piston connected to said second piston rod to displace hydraulic fluid when said second piston rod is extended, said second piston being exposed to said pressure chamber and having a piston area that is greater than the piston area of said first piston; and
   second choke means, cooperating with said second piston and defining a narrow flow cross section, for imparting a braking force on said gun barrel when said hydraulic fluid is displaced as said second piston rod is extended, said second choke means including a control sleeve which is provided on said outer cylinder and which has a surface configured to control said narrow flow cross section of said second choke means.

2. The recoil brake of claim 1, wherein a restoring means cooperates with the recoil brake to push said first piston rod back to its inserted position after the recoil has been braked, wherein said second piston rod has a start position, and further comprising dogs that are positioned for abutment by said first piston rod to return said second piston rod to said start position when said first piston rod is pushed back to said inserted position.

3. The recoil brake of claim 1, wherein said first piston rod, said second piston rod, and said intermediate hollow member are cylindrical.

4. The recoil brake of claim 1, wherein said control sleeve of said second choke means has first and second ends and has an internal surface which is exposed to said pressure chamber, said internal surface having an elongated groove which extends from a position adjacent said first end of said control sleeve to a position adjacent said second end of said control sleeve.

* * * * *